HOUSE & SNYDER.
Velocipede.
No. 89,047.
Patented April 20, 1869.
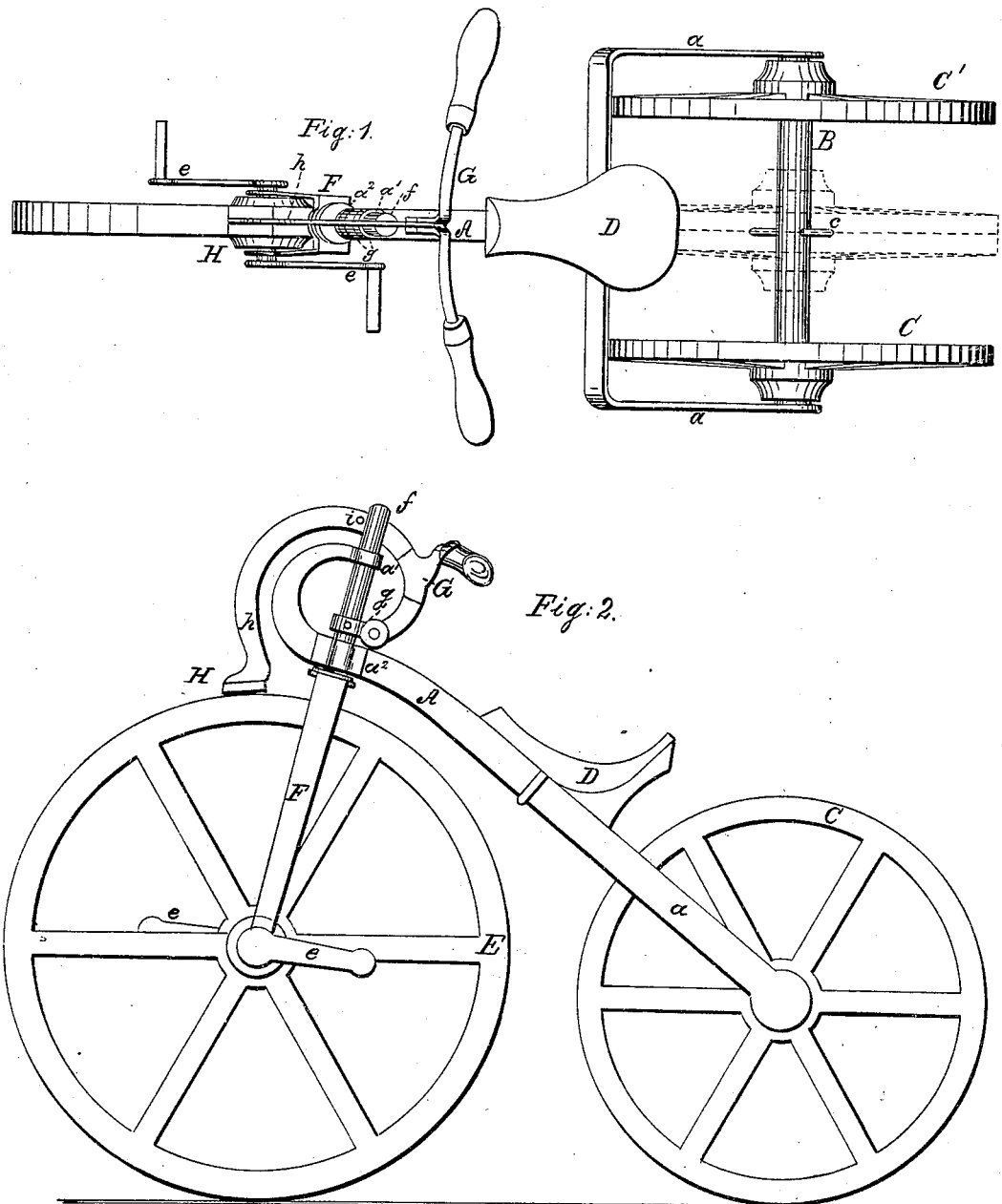

JAMES A. HOUSE AND WILLIAM B. SNYDER, OF BRIDGEPORT, CONNECTICUT.

*Letters Patent No. 89,047, dated April 20, 1869.*

IMPROVEMENT IN VELOCIPEDE.

The Schedule referred to in these Letters Patent and making part of the same.

*To all whom it may concern:*

Be it known that we, JAMES A. HOUSE and WILLIAM B. SNYDER, both of Bridgeport, in the county of Fairfield, and State of Connecticut, have invented certain new and useful Improvements in Velocipedes, of which the following is a full, clear, and exact description.

The first part of our invention relates to the devices for steering and stopping the velocipede; and Our improvement consists in a novel method of combining a brake with a steering-handle in such manner that the brake can be operated at any angle to which the wheel may be turned.

The object of the next part of our invention, is to convert the velocipede from a two-wheeled to a three-wheeled one, or *vice versa*, at pleasure, and our improvement consists in a novel method of combining with the main axle, a wheel divided longitudinally, so that its sections may be separated at pleasure, to form separate wheels, or united, to form a single wheel, by adjusting and holding the sections at distances equidistant from the centre of the axle, by studs inserted in the axle, as hereinafter described.

In the accompanying drawings—

Figure 1 represents a plan, and

Figure 2, a side elevation of our improved velocipede.

The frame, or perch A, is forked at its rear end.

The axle B is fixed in these forks $a$.

The wheels C C' turn loosely on this axle, and are so constructed that they may be fastened together at the centre of the axle, to form one wheel, and yet turn freely. They may also be separated, and secured to the axle near its ends, and thus form two wheels. We thus combine the advantages of both classes of vehicles, the two-wheeled and the three-wheeled.

A suitable stop, or pin $c$, in the middle of the axle, keeps each wheel on its own side. In this instance, we have simply shown holes in the axle to receive pins to hold the wheels in the desired position. We, however, contemplate using a lever or levers, to adjust the wheels from the rider's seat, or springs and detents, to hold them when adjusted.

The rider sits on a saddle, D, on the perch. The front wheel, E, is mounted in a yoke, F, terminating in a round spindle, $f$, which turns in bearings $a^1$ $a^2$ in the perch.

The wheel is driven by foot-cranks $e$ in the usual way.

A steering-handle, G, is pivoted to play vertically in a collar, $g$, fixed on the spindle $f$.

A brake-shoe, H, is fixed on the end of an arched bar, $h$, attached to the steering-handle, and passing through a slot in the top of spindle $f$.

A pin, $i$, prevents the brake from rising too far from the wheel, and also acts as a stop, to prevent the handle from descending too far.

The operation of the device is obvious: To apply the brake, the rider has simply to lift the handle, and as the wheel, brake, and handles always occupy the same relative position, the brake acts efficiently at all times. As the handle performs two offices, the mechanism is simplified.

What we claim as our invention, and desire to secure by Letters Patent is—

The combination, in a velocipede, of the steering-wheel, the steering-handle, and the brake, all constructed, arranged, and operating as set forth.

Also, the combination, with the velocipede, of the sectional wheels, adjustable at equal distances from the centre of the axle, by studs inserted in the axle, as set forth.

In testimony whereof, we have hereunto subscribed our names.

JAMES A. HOUSE.
WILLIAM B. SNYDER.

Witnesses:
GEORGE C. BISHOP,
CHARLES H. DEMOND.